Oct. 31, 1939.  C. A. SAWTELLE  2,178,148
BRAKE MECHANISM
Filed Jan. 10, 1938    2 Sheets-Sheet 2
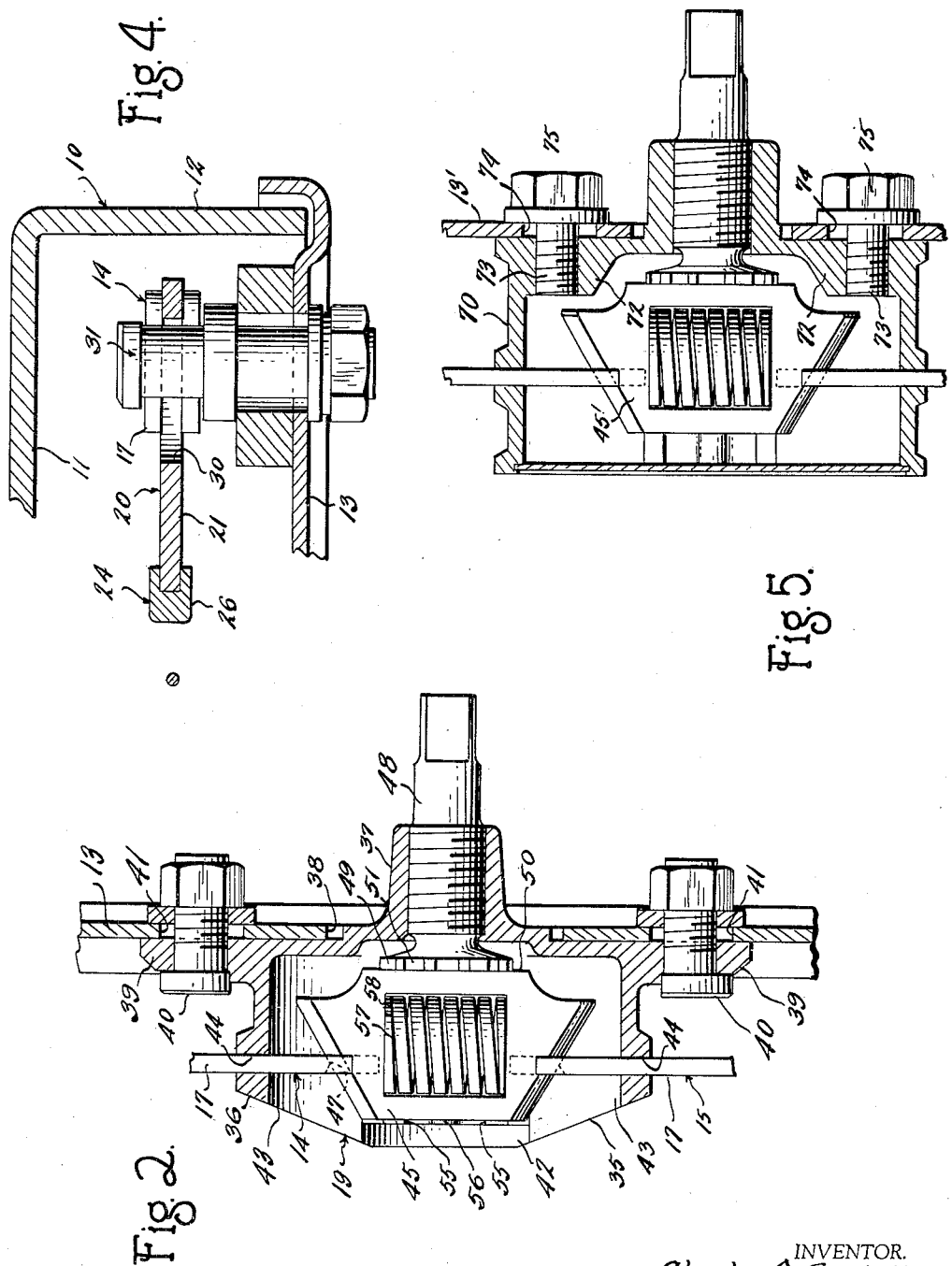
INVENTOR.
Charles A. Sawtelle
BY
ATTORNEY.S Patented Oct. 31, 1939

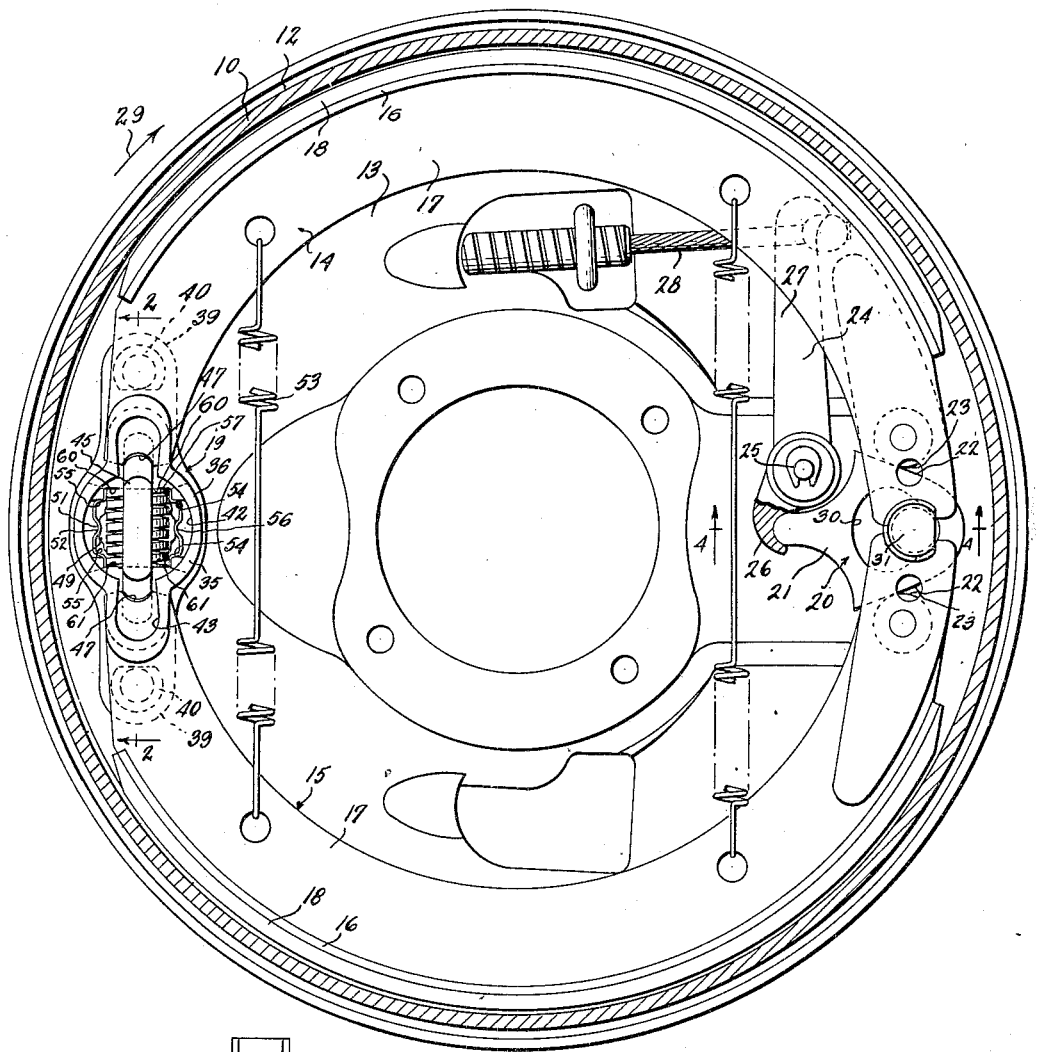
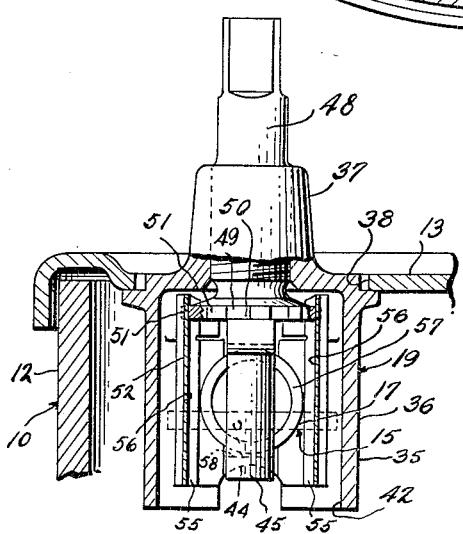
Fig. 1.
Fig. 3.
INVENTOR.
Charles A. Sawtelle
BY
ATTORNEYS

2,178,148

UNITED STATES PATENT OFFICE 2,178,148

BRAKE MECHANISM

Charles A. Sawtelle, Detroit, Mich., assignor to Kelsey-Hayes Wheel Company, Detroit, Mich., a corporation of Delaware Application January 10, 1938, Serial No. 184,292

10 Claims. (Cl. 188—79.5)

This invention relates generally to brake mechanisms and refers more particularly to improvements in brake constructions of the type employed in association with the ground engaging wheels of motor vehicles.

One of the principal objects of this invention resides in the provision of brake mechanism having friction means supported in the brake drum for shifting movement circumferentially of the drum and having centering means for the friction means composed of a relatively few simple parts capable of being inexpensively manufactured, assembled, and installed.

Another object of this invention is to provide an adjustment device for the brake friction means supported between adjacent ends of the friction means for shifting movement with the latter circumferentially of the drum and having means associated therewith for accurately centering the friction means in the drum after each brake application.

A further advantageous feature of the present invention consists in the provision of an adjustment device of the character set forth having a wedge movable axially of the drum between the ends of the friction means for moving the latter outwardly relative to the brake drum and carrying a spring cooperating with fixed shoulders spaced from each other circumferentially of the drum to effectively center the friction means in the drum.

In addition to the above, the present invention contemplates brake mechanism wherein the adjustment wedge is supported for shifting movement circumferentially of the drum in either direction of rotation of the latter and wherein the convolutions of the spring carried by the wedge are spaced from each other a sufficient distance to permit the extent of shifting movement of the wedge required to transfer the full torque from one end of the friction means to the other end of the latter.

The foregoing, as well as other objects, will be made more apparent as this description proceeds, especially when considered in connection with the accompanying drawings, wherein—

Figure 1 is an elevational view, partly in section, of brake mechanism having an adjustment device and centering means constructed in accordance with this invention;

Figure 2 is a sectional view taken substantially on the plane indicated by the line 2—2 of Figure 1;

Figure 3 is a detail sectional view of the adjustment device and centering means;

Figure 4 is a sectional view taken substantially on the plane indicated by the line 4—4 of Figure 1; and Figure 5 is a horizontal sectional view through a slightly modified form of adjustment device.

The brake mechanism illustrated in Figures 1 to 4, inclusive, includes a brake drum 10 having a web 11 and having an annular flange 12 extending axially from the periphery of the web. In accordance with conventional practice, the rear side of the drum is closed by a backing plate 13 fixed against rotation with respect to the drum and adapted to support the brake friction means within the drum.

In the present instance, the brake friction means comprises a pair of shoes 14 and 15 supported on the backing plate 13 with the opposite ends of each shoe spaced from the adjacent end of the other shoe circumferentially of the brake drum. The shoes are preferably T-shaped in cross section having the axially extending head portions 16 and having the stem or web portions 17 extending radially inwardly in a common plane substantially parallel to the plane of rotation of the drum. A suitable brake lining 18 having the desired coefficient of friction is secured to the outer surface of each of the axially extending head portions 16 of the brake shoes in a position to engage the inner annular surface of the brake flange 12 when the shoes are moved outwardly toward the brake flange.

Upon reference to Figure 1, it will be noted that a suitable adjustment device 19 is supported between the ends of the shoes at one side of the drum and that an actuator 20 is located between the ends of the shoes at the opposite side of the drum. Both of the above instrumentalities are supported for shifting movement with the brake shoes circumferentially of the drum in either direction of rotation of the latter in order to enable torque to be transferred from the leading shoe to the trailing shoe when the brake is applied. As will be presently set forth, the actuator 20 functions to swing the shoes outwardly relative to the drum about the adjustment device to engage the friction linings 18 with the brake flange 12 of the drum and the adjustment device 19 serves to swing the shoes outwardly about the actuator to vary the clearance between the friction linings 18 and inner annular surface of the brake flange.

It will, of course, be understood that various different types of actuators may be employed to swing the brake shoes outwardly into engagement with the brake flange and, accordingly, the present invention should not be limited to the specific type of actuator shown herein. For the purpose of illustration, the actuator 20 is shown as having a wedge 21 supported on the backing plate between the ends of the brake shoes at one side of the drum for movement radially outwardly relative to the backing plate and adjacent ends of the shoes. The opposite edges 22 of the wedge diverge radially inwardly and are adapted to be engaged by rollers 23 carried by the adjacent ends of the shoes. As a result, movement of the wedge radially outwardly relative to the backing plate causes the adjacent ends of the shoes to move outwardly about the adjustment device 19 and effects engagement of the friction linings 18 on the shoes with the brake flange 12.

In the present instance, the wedge 21 is moved radially outwardly by means of a lever 24 pivotally mounted on the backing plate by means of a pivot 25. As shown in Figure 1, the lever 24 has a short arm 26 fashioned to engage the radially inner end of the wedge and is provided with a relatively longer arm 27 having the free end thereof operatively connected to the brake actuating cable 28. In accordance with conventional practice, the cable 28 extends from the arm in a direction opposite the forward direction of rotation of the brake drum indicated in Figure 1 by the reference character 29 and projects through a suitable opening in the backing plate 13 for connection with a control element (not shown).

It will also be noted from Figure 1 of the drawings that the wedge 21 is provided with an opening 30 therethrough for receiving a stud 31. The stud 31 forms an abutment for the adjacent ends of the brake shoes and is secured to the backing plate 13. It will be noted from Figure 4 that the stud extends through a radially projecting slot in the backing plate 13 so as to permit adjusting the stud during assembly to properly position the brake shoes relative to the axis of rotation of the brake drum.

It has previously been stated that the actuator 20 shifts with the brake shoes circumferentially of the drum in either direction of rotation of the drum. For accomplishing this result, the dimension of the opening 30 through the wedge is sufficiently greater than the diameter of the portion of the stud 31 extending therethrough to provide the necessary clearance for the wedge to shift with the brake shoes in either direction the extent required for full torque to be transferred from the leading shoe to the trailing shoe. As stated above, the adjustment device 19 is for the purpose of varying the clearance of the brake linings 18 on the shoes and the brake flange 12. The adjustment device comprises a bracket 35 having a portion 36 located within the brake drum between the adjustment ends of the shoes and having a reduced portion 37 extending through an enlarged opening 38 in the backing plate 13. The opening 38 is of sufficient dimension to permit accurately adjusting the bracket during assembly and is sealed by the portion 36 of the bracket. As shown in Figure 2 of the drawings, lugs 39 extend outwardly from diametrically opposite sides from the portion 36 of the bracket and these lugs are secured to the backing plate 13 by means of the fastener elements 40. In this connection, attention is called to the fact that the fastener elements also extend through enlarged openings 41 in the backing plate which cooperate with the enlarged opening 38 to provide for universal adjustment of the bracket in a plane parallel to the plane of rotation of the brake drum. After the bracket has been properly positioned in the brake drum, the fastener elements are manipulated to clamp the portion 36 of the bracket against the front side of the backing plate and prevent shifting movement of the bracket relative to the backing plate.

Upon reference to Figure 3, it will be noted that the bracket is provided with an axially extending bore 42 having opposed lateral extensions 43 slotted, as at 44, to freely receive the adjustment ends of the brake shoes. A substantially flat wedge 45 is mounted in the bore 42 between the adjustment ends of the shoes for movement axially of the bore and the opposite edges of the wedge are tapered in the manner indicated in Figure 2 for engagement with the adjacent ends of the brake shoes. Attention is called to the fact that the tapered edges of the wedge 45 are transversely curved and the adjacent ends of the shoes are recessed, as at 47, to receive the edge portions. The construction is such that movement of the wedge axially in the bore 42 in a forward direction from the backing plate 13 causes the shoes to swing outwardly about the abutment 31 to decrease the clearance between the brake linings 18 on the shoes and the inner annular surface of the brake flange 12.

The wedge is moved in the aforesaid direction relative to the bracket by means of a screw 48 threaded in the reduced portion 37 of the bracket and having a cylindrical enlargement 49 on the forward end abutting the adjacent rear face 50 of the wedge. The enlargement 49 is formed with circumferentially spaced notches 51 on the cylindrical surface thereof and these notches cooperate with suitable spring detents 52 to not only prevent accidental rotation of the screw 48, but to also indicate predetermined increments of adjustment.

Assuming that it is desired to adjust the brake friction means, the operator merely threads the screw 48 into the reduced portion 37 of the bracket until the wedge 45 has moved forwardly the distance required to engage the friction linings 18 on the shoes with the inner annular surface of the brake flange 12. The screw 48 is then backed off the number of increments of adjustment necessary to secure the desired adjustment and the retraction spring 53 moves the adjustment ends of the shoes radially inwardly the extent determined by the adjustment of the wedge. In this connection, it will be noted that the retraction spring 53 has the opposite ends respectively connected to the primary and secondary shoes 15 and 14 adjacent the adjustment ends thereof.

Referring again to Figure 1 of the drawings, it will be noted that a pair of spring detents 52 is provided for accomplishing the results previously set forth, and that these detents are located at the radially inner and outer sides of the enlargement 51 on the forward end of the screw 48. Both detents extend for substantially the full length of the bore 42 and are substantially channel-shaped in cross section. Each detent is positioned between a pair of shoulders 54 formed in the bracket to extend axially of the bore 42 and the opposed side flanges 55 engage the shoulders 54 under tension to hold the detents in assembled relationship with the bracket. In addition, it will be noted from Figure 1 that the base portions of the detents are fashioned to provide a longitudinally extending rib 56 adapted to successively engage in the notches 51 formed in the enlargement 49 at the forward end of the screw 48.

As shown in Figure 2, sufficient clearance is provided in the bracket at each side of the wedge 45 to permit the latter to shift with the brake shoes circumferentially of the drum in either direction of rotation of the drum. The wedge is centered in the bracket and the brake shoes are, accordingly, centered in the brake drum by means of a compression spring 57. The compression spring 57 extends transversely of the wedge and is inserted in a radial slot 58 formed in the central portion of the wedge. The diameter of the spring is such that the convolutions thereof extend radially beyond opposite sides of the wedge and the opposite ends of the spring respectively engage the shoulders 60 and 61 formed in the bracket 35. Upon reference to Figure 1, it will be noted that the shoulders 61 are positioned upon the radially inner and outer sides of the wedge adjacent the adjustment end of the primary shoe 15, while the shoulders 60 are similarly positioned adjacent the adjustment end of the secondary shoe 14. These shoulders are accurately located by properly adjusting the bracket 35 during assembly so that when the ends of the spring 57 abut the shoulders in the released position of the brake shoes, the latter are accurately centered in the brake drum.

Assuming that the brake shoes are applied to the brake flange 12 of the drum when the latter is rotating in the direction of the arrow 29 in Figure 1, it will be noted that the torque developed in the primary shoe will effect a displacement of the wedge 45 and associated spring 57 in a direction away from the shoulders 61 to transfer the torque to the secondary shoe 14. This action, of course, further compresses the spring 57 so that when the actuator is released, this spring automatically returns the wedge to its center position wherein the shoulders 61 are again engaged by the adjacent end of the spring. Assuming now that the brake drum is rotating in the reverse direction and the brake shoes are applied, it will be noted that the wedge 45, with the spring 57, is moved in the reverse direction by the shoe 14 to transfer torque to the shoe 15. In other words, the end of the spring 57 adjacent the shoe 14 moves away from the shoulders 60. Of course, when the actuating pressure is released, the spring 57 will return the wedge and shoes to their center positions in the brake drum in the same manner previously set forth. In this connection, attention is called to the fact that in the event it is desired to transfer full torque from one shoe to the other in either direction of rotation of the drum, the convolutions of the spring 57 are spaced axially from each other a sufficient distance so that they will not contact with one another and form a positive stop.

The embodiment of the invention illustrated in Figure 5 is identical to the one previously set forth with the exception of the particular construction of the bracket 70 for the adjustment wedge 45'. As shown, this bracket has a greater axial dimension than the bracket in the first described form of the invention and the lugs 39 are eliminated to provide a more compact construction. As shown in Figure 5, the wall of the bracket adjacent the backing plate 13' is fashioned with bosses 72 threaded to receive the screws 73. The screws 73 extend through enlarged openings 74 in the backing plate to provide the desired adjustment of the bracket and the head portions 75 engage the rear face of the backing plate to accomplish the clamping function.

What I claim as my invention is:

1. In brake mechanism, a brake drum revoluble in opposite directions, brake friction means supported within said drum for shifting movement circumferentially of the drum in both directions and having spaced ends, an adjustment wedge movable transversely of the brake drum between the ends of the friction means for moving said ends outwardly relative to the drum and supported for shifting movement with the friction means in both directions of rotation of the drum, and a single spring carried by the wedge and resisting shifting movement of the wedge from its center position in the brake drum in either direction of rotation of the brake drum.

2. In brake mechanism, a brake drum, brake friction means supported within said drum for shifting movement circumferentially of the drum and having spaced ends, a member movable transversely of the drum between said ends and engageable with the latter ends, means supporting said member for shifting movement with the friction means circumferentially of the drum, a pair of abutments spaced from each other in the direction of shifting movement of said member, and a spring carried by said member and engaging the abutments to center the member in the brake drum.

3. In brake mechanism, a brake drum, brake friction means supported within said drum for shifting movement circumferentially of the drum and having spaced ends, means for adjusting the friction means relative to the drum including a member movable transversely of the drum between the ends of the friction means and engageable with said ends, means supporting said member for shifting movement with the friction means circumferentially of the drum, a pair of abutments spaced from each other in the direction of shifting movement of the member and also located between the ends of the friction means, and a coil spring arranged under compression in a radial slot in the member and having the ends engageable with the abutments to center the member in the brake drum.

4. In brake mechanism, a brake drum revoluble in opposite directions, brake friction means supported within said drum for shifting movement circumferentially of the drum in both directions of rotation of the latter and having spaced ends, means for adjusting the friction means relative to the drum including a member movable transversely of the drum between the ends of the friction means and engageable with said ends, means supporting said member for shifting movement with the friction means circumferentially of the drum in both directions of rotation of the latter, a spring having its axis extending in the general direction of shifting movement of the member and arranged under compression in a radial slot in the member, and a pair of fixed abutments engageable with the opposite ends of the spring and cooperating with the latter to yieldably maintain the member in its center position in the brake drum.

5. In brake mechanism, a brake drum, brake friction means supported within said drum for shifting movement circumferentially of the drum and having spaced ends, means for adjusting the friction means relative to the drum including a wedge member movable transversely of the drum between the ends of the friction means and engageable with said ends, means supporting the wedge for shifting movement with the friction means circumferentially of the drum, a coil spring arranged under compression in a radially extending opening in the wedge with the axis thereof extending in the general direction of shifting movement of the wedge and having the convolutions projecting radially beyond the inner and outer sides of the wedge, and fixed abutments engageable with the ends of the coil spring to center the wedge and brake friction means in the drum.

6. In brake mechanism, a brake drum, brake friction means supported within said drum for shifting movement circumferentially of the drum and having spaced ends, means for adjusting the friction means relative to the drum including a substantially flat wedge movable transversely of the drum between the ends of the friction means and having the opposite edges engageable with the ends, means supporting the wedge for shifting movement with the friction means circumferentially of the drum, a coil spring arranged under compression in a radially extending slot in the wedge with its axis extending in the general direction of shifting movement of the wedge and with the convolutions thereof extending radially beyond the inner and outer sides of the wedge, and fixed abutments at the radially inner and outer sides of the wedge engageable with the opposite ends of the spring to center the wedge and friction means in the drum.

7. In brake mechanism, a brake drum revoluble in opposite directions, brake friction means supported within said drum for shifting movement circumferentially of the drum in both directions of rotation of the latter and having spaced ends, a member movable transversely of the drum between the ends of the friction means and engageable with said ends, means supporting said member for shifting movement with the friction means circumferentially of the drum in both directions of rotation of the latter, a coil spring arranged under compression in a radial opening in the member with the axis thereof extending in the general direction of shifting movement of the member and with the convolutions thereof extending beyond the radially inner and outer sides of said member, fixed abutments engageable with the opposite ends of the coil spring to center the member and friction means in the drum, the convolutions of the coil spring being spaced axially of the spring a sufficient distance to permit the transfer of the full torque from one end of the friction means to the other through the member.

8. In brake mechanism, a brake drum, a backing plate for the drum, brake friction means supported within said drum for shifting movement circumferentially of the drum and having spaced ends, a bracket secured to the backing plate between the ends of the friction means and having the sides adjacent the latter ends slotted to freely receive said ends, a wedge movable transversely of the bracket with the opposite sides engaging said ends of the friction means and shiftable with the friction means relative to the bracket circumferentially of the drum, a coil spring arranged under compression in a radial opening in the wedge with the axis thereof extending in the general direction of shifting movement of the wedge and with the convolutions projecting beyond the radially inner and outer sides of said wedge, and abutments on the bracket engaging the opposite ends of the coil spring to center the wedge in the bracket and to center the friction means in the brake drum.

9. In brake mechanism, a brake drum, a backing plate for the drum, brake friction means supported on the backing plate within the drum and having spaced ends, a bracket secured to the backing plate and having a portion located within the drum provided with a bore extending axially of the drum, a wedge mounted in the bore for movement axially of the latter between the ends of the friction means for adjusting said friction means relative to the drum, means for moving said wedge relative to the bracket including a screw having a portion abutting the adjacent end of the bracket provided with circumferentially spaced notches therein, a pair of shoulders extending longitudinally of the bore in spaced relation to each other circumferentially of the bore, and a spring member held under tension between the shoulders and having a portion successively engageable with said notches.

10. In brake mechanism, a brake drum revoluble in opposite directions, brake friction means supported within said drum for shifting movement circumferentially of the drum and having spaced ends, an adjustment wedge movable transversely of the brake drum between the ends of the friction means for moving said ends outwardly relative to the drum and supported for shifting movement with the brake friction means relative to the drum, a revoluble member for moving the adjustment wedge, a pair of abutments spaced from each other in the direction of circumferential shifting movement of the wedge, spring means positioned by said abutments and cooperating with the revoluble member to indicate predetermined increments of adjustment of the wedge, and additional spring means carried by the wedge and effective to normally maintain the wedge in its center position in the brake drum.

CHARLES A. SAWTELLE.